United States Patent [19]
Matsui et al.

[11] 4,113,824
[45] Sep. 12, 1978

[54] PROCESS FOR PRODUCING RECEPTACLES FROM A THERMOPLASTIC RESIN FOAM SHEET

[75] Inventors: Takashi Matsui, Nara; Sadao Sugimura, Gose; Kunio Noo, Nara, all of Japan

[73] Assignee: Sekisui Kaseikin Kogyo Kabushiki Kaisha, Nari, Japan

[21] Appl. No.: 703,421

[22] Filed: Jul. 8, 1976

[30] Foreign Application Priority Data

Jul. 11, 1975 [JP] Japan .................... 50-85549

[51] Int. Cl.² .............................. B29C 13/00
[52] U.S. Cl. ..................... 264/230; 264/248; 264/321
[58] Field of Search ............ 264/321, 51, 230, 45.1, 264/248

[56] References Cited

U.S. PATENT DOCUMENTS

| | | | |
|---|---|---|---|
| 2,526,311 | 10/1960 | Wilson | 264/45.1 |
| 2,989,785 | 6/1961 | Stahl | 264/230 |
| 3,344,222 | 9/1967 | Shapiro et al. | 264/51 |
| 3,370,117 | 2/1968 | Blue | 264/321 |
| 3,673,033 | 6/1972 | MacDaniel et al. | 264/321 |
| 3,792,137 | 2/1974 | Seto | 264/51 |
| 3,919,368 | 11/1975 | Seto | 264/51 |
| 3,967,991 | 7/1976 | Shimano et al. | 264/321 |
| 3,970,492 | 7/1976 | Anberg | 264/230 |

FOREIGN PATENT DOCUMENTS

43-26,100 0000 Japan ................ 264/321

Primary Examiner—Jay H. Woo
Attorney, Agent, or Firm—Armstrong, Nikaido, Marmelstein & Kubovcik

[57] ABSTRACT

Die for producing receptacles substantially impervious to liquid by bonding a bottom plate to an apertured receptacle made from a uni-directionally shrinkable thermoplastic resin foam sheet into an apertured receptacle having a flat annular portion provided in continuous with the lower end thereof comprises a female mold and a male mold defining when they are clamped together clearnaces therebetween whose thickness is less than that of the peripheral side wall of the apertured receptacle at the portion corresponding to the peripheral side wall and less than those of the annular portion of the apertured receptacle and the bottom plate at the portion corresponding to the bottom of the resulting receptacle, and at least one annular ridge having a height 50 – 90 % of the thickness of the clearance at the bottom and being integrally provided either on the inner surface of the female mold or the outer surface of the male mold at the portions against which the annular portion of the apertured receptacle is abutted.

24 Claims, 33 Drawing Figures

PROCESS FOR PRODUCING RECEPTACLES FROM A THERMOPLASTIC RESIN FOAM SHEET

DESCRIPTION OF THE PRIOR ART

Most of conventional methods for producing receptacles such as cups from thermoplastic resin foam sheet have been by heating to soften a flat foam sheet and then vacuum forming or pressure forming the heated sheet. The receptacles obtained by such methods can be held even when they are filled with a hot liquid since they consist of a heat insulating thermoplastic resin foam. However, since the receptacles are made from a thermoplastic resin foam sheet by heating the sheet to soften it, forcedly stretching the sheet and integrally forming a side wall and a bottom, the thickness of the side wall and the bottom of the resultant receptacle is reduced, in particular, at the corners where the side wall and the bottom join, because the elongation of the foam sheet has certain limits which disadvantageously decreases the strength of the receptacle per se, as well as resulting in pores in the vincinity of the joining corners, resulting in a loss in water imperviousness.

In order to overcome the foregoing defects, improved methods have been proposed as disclosed in U.S. Pat. No. 3,846,526 and U.S. Pat. Re 28,364 in which the bottom of a receptacle whose thickness has been reduced during a forming process undergoes post-expansion by way of heating under vacuum, to advantageously produce a finished receptacle of a uniform thickness.

However, since it is necessary in such methods to pre-form a roughly shaped receptacle once, the above defect already results in this pre-forming process, thus imposing inevitable restrictions in employing the methods.

It has therefore been impossible to produce a deep receptacle, that is, one having a height greater than the diameter of the opening, by the above methods.

U.S. Pat. Nos. 3,547,012, 3,673,033 and the like disclose another method of producing a receptacle from a thermoplastic resin foam sheet which has been cut into the shape of a frustoconical body by bending the body into a cylindrical shape, bonding both edges of the sheet to form a cylindrical side wall and then fitting a bottom plate made of the same material as the side wall into the peripheral bottom edge of the cylindrical side wall. Although the above method can produce a deep receptacle having a height greater than the diameter of the opening, it is necessary to cut the foam sheets for the side wall of the receptacles into complicated shapes such as a developed cone surface of a frustoconical body as described above to produce a receptacle having a opening and a bottom whose diameters are different from each other. As a result, the efficiency of use of the foam sheets is low due to the cutting of the side wall of the receptacle from the foam sheet, and such process is economically disadvantageous.

In addition, the forming processes of the above mentioned method are extremely complicated since a cylindrical body and a bottom plate with a peripheral leg portion must be pre-prepared and, moreover, the surface to be bonded must be softened by a solvent prior to bonding and then pressure applied.

In view of the foregoings, improved methods have been proposed in German Pat. No. 1,479,805, Japanese Patent Publication 11669/1960 and the like, wherein a receptacle is produced from a foam sheet whose heat shrinkage in a first direction is much higher than the heat shrinkage in the direction perpendicular to the first direction. These patents disclose, for example, a method for producing a receptacle comprising the steps of expanding a cylindrical article of a thermoplastic synthetic resin which has been extruded into an annular section to orientate the molecules therein in such a way that the cylindrical article shrinks towards its center axis, placing the article over a mold of a smaller diameter than the article, attaching a bottom plate thereto, subjecting the assembly to shrinking by heating, thus tightly fitting the assembly to the mold, and then bonding the cylinder and the bottom. This method, however, can only be adopted to the production of a non-forming and, in particular, a thin walled receptacle. Receptacles of a foamed resin can not be produced by this method because foam resin sheets require a certain period of aging after they are produced to stabilize their quality and, generally, cannot be subjected to fabrication immediately after production.

Since foamed resin sheet are much thicker and exhibit considerable rigidity as compared with non-foamed resin sheets, they cannot be, once formed into a cylindrical shape, either rolled up or stored for aging purpose.

It is also extremely difficult to expand a foamed resin sheet in such a way as to provide shrinkage in only one direction. It can safely be stated that the industrial production of foamed resin receptacles is impossible by the method disclosed in the German Pat. No. 1,479,805 and Japanese Patent Publication 11669/1960. An improvement in the above method which involves producing a receptacle from a uni-directionally shrinkable thermoplastic resin foam sheet is disclosed in U.S. Pat. No. 3,854,583 and in German Patent Laid Open Publication 2,250,638. Firstly, sleeve of a tubular resin foam sheet whose shrinkage in a first direction is higher than the shrinkage in the direction perpendicular to the first direction is placed over a mandrel having an outer forming surface of a frustoconical shape approximately corresponding to the desired inner surface of the side wall of the receptacle to be formed. The tubular resin form sheet is subjected to heat shrinking until the inner surface is closely fitted to the outer forming surface of the mandrel. Then, pressure is applied only to an approximately annular portion present in the direction perpendicular to the longitudinal axis of the mandrel to collapse the annular portion and, at the same time, the materials in the annular portion are melted to thereby close the inside of the flat annular portion in a water tight manner. Cup shaped receptacles capable of stacking are thus produced. However, the receptacles produced by the foregoing method are defective in view of the points described below.

1. Since the cylindrical article for forming the side wall of the receptacle consists of a heat shrinkable resin foam sheet, it undergoes shrinking when heated and closely adheres to the outer forming surface of the mandrel, as well as undergoing post-expansion. Considering the above phenomenon from the view point of changes of the form of cells, since cells present in the resin foam sheet are stretched in the production process in the direction of the shrinkage of the sheet and the sheet is then cooled in this state, the cells retain a tendency to shrinking. When the sheet is heated to a temperature above its softening point, the above shrinking tendency is developed thereby causing the sheet to shrink in the direction of the stretching while, simultaneously, gas present in the cells is expanded to cause post-expansion. Comparing the surface condition of the sheet between prior to heating and after shrinking, while the surface of the sheet is relatively smooth before heating (because the cells are stretched), the sheet surface is uneven after heat shrinking (because the cells take a spherical shape). Since, in addition, it is difficult to provide a uniform thickness and uniform cell structure throughout the sheet, in view of the nature of producing the sheet, irregularities on the surface of the sheet are inevitable, and the irregular and uneven nature of the sheet surface cause irregular reflection and significantly worsens the appearance of the sheet, in particular, when printing is applied. When shrinking is performed after the application of printing to be sheet, the printed matter is also hard to read due to the generation of surface unevenness.

2. In the method described above, a cylindrical article is placed over a mandrel and subjected to heat shrinking in such a manner that the article takes a shape similar to that of the outer forming surface of the mandrel, whereafter the bottom is joined thereto to form a receptacle having a water tight bottom. At this state reinforcement of the edge of the opening should be effected. Reinforcement of the edge of the opening can be performed by the processes such as conventional lip curling, lip rolling and the like as are employed for paper cups, etc., as well as by a compression method wherein a high density portion is formed by compressing the highly foamed sheet. Any of the above methods require detaching the receptacle from the mandrel, mounting it on a rib-former and heating again to form a rib. This not only reduces the production rate because of an increase in the cycle time but also results in defects such as uneven thickness in the products and increased fragility, resulting in a loss of resiliency caused upon post-expansion generated on the sheet material because the receptacle undergoes temperature changes attributable to the repeated heating, that is, heating (in forming the cylinder) → cooling (in detaching the cylinder) → heating (in rib formation)→ cooling.

3. Since the receptacle is formed in the foregoing method by a heat shrinking, the thickness of the side wall of the receptacle gradually increases from its relatively low thickness at the top to its relatively great thickness at the bottom in the case of producing a stackable receptacle. Where a deep receptacle is produced using a sheet 0.5 mm in thickness, for example, the resultant wall thickness is 0.7-0.9 mm at the opening and 1.1 mm-1.3 mm at the bottom of the receptacle. Thus, in the resultant receptacle, the thickness at the opening and the thickness at the bottom considerably from each other. When such a receptacle is placed over a mandrel and printed by rotating a printing plate carrying ink around the receptacle, wrinkles are produced at the contact areas of the printing plate and the cup surface in the thick portions due to the difference in the wall thicknesses of the side wall of the receptacle, thereby rendering it impossible to produce fine printing. Although the heat insulating capability which results from an increase in the wall thickness may be emphasized as a great merit in this method, the inventors of the present application have found, as the result of actual measurements, that heat conductivities vary only in the range between 0.035-0.040 Kcal/m.hr.° C. for changes in density between about 0.3-0.1 g/cc and in thickness between about 0.5-1.5 mm of a heat shrinkable sheet as is used for production of such receptacles, i.e., there are scarecely an difference between heat conductivities in such receptacles. When a receptacle is made of a foamed sheet with a density and thickness as low as 0.2 g/cc and 0.4 mm respectively, and filled with hot water at 90°-95° C., it has a surface temperature of about 70° C. and can easily be held.

In view of the above two points, it has been found that increased wall thickness is not practically preferred because the increase in the bottom of the side wall causes an increase in stack height, although it does contribute somewhat to an increase in the heat insulating capability.

The literature mentioned above, U.S. Pat. No. 3,854,583 and German Patent Lain Open Publication 2,250,638 also disclose a method of producing a receptacle comprising placing a sleeve of a heat shrinkable foam sheet over a mandrel, subjecting the same to shrinking by heating until it closely fits the forming surface of the mandrel, forming an approximately flat annular portion in transverse to the longitudinal axis of the mandrel, pressing only the annular portion while it is kept at high temperature by means of a bottom pressing member and fusion bonding a bottom plate to the annular portion to thereby form a bottom.

However, when the bottom plate is merely pressed to only the annular portion in this method, a sufficient fusion bond is not obtained between the two members. This often causes liquid filled in the receptacle to leak through the insufficient bond at the bottom and produces squeeze-out of molten resin at the juncture between the bottom plate and the side wall to form burrs at the bottom of the resultant receptacle thereby decreasing the commercial value thereof, as well as results in a trouble in stacking the receptacle.

In order to overcome the above defect, the inventors of the present application proposed in OLS 2,361,038 a method, wherein an apertured receptacle having a preformed flat and annular portion and a bottom plate are compressed in a male and female mold assembly and, subsequently, edge portion at the upper opening is compressed by way of a rib-pressing member slidably provided between the male mold and the female mold to form a rib around the periphery of the receptacle and to make the side wall thickness thereof uniform. Although the bottom plate and the rib can advantageously be formed in substantially the same step in this method, a desirable receptacle is not obtained since the bottom plate and the side wall cannot sufficiently join and resin squeezes out at the resultant rib.

SUMMARY OF THE INVENTION

In view of the foregoing, the inventors have made further studies for the method of joining a bottom plate to an apertured receptacle having a pre-formed flat annular portion which is continuous with periphery of the lower edge of its side wall, using a uni-directionally shrinkable thermoplastic resin foam sheet which shrinks more significantly in only one direction than in the direction perpendicular thereto and, as a result, have successfully accomplished a die assembly, wherein a clearance between a male mold and a female mold is adjusted when an annular portion and a bottom are subjected to compression molding using a pair of mold pieces to eliminate the heretofore stated defects in the prior art and result in a firm bond of the bottom plate to the annular thereby enabling to produce receptacles of fine appearance with no burrs at the bottom.

BRIEF DESCRIPTION OF THE DRAWINGS

Drawings show preferred embodiments of the present invention wherein FIGS. 1-4 respectively illustrate steps of producing an apertured receptacle.

FIGS. 24 to 25 are sectional views of an enlarged portion of a resin foam sheet in the preparation of a cylindrical article, in which FIG. 24 illustrates before bonding and FIG. 25 illustrates after bonding;

DETAILED DESCRIPTION OF THE INVENTION

Figure 1:
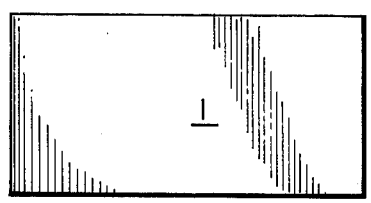
FIG. 1 is a plan view of a uni-directionally shrinkable thermoplastic resin foam sheet as a material for a receptacle in this invention.

Dies of the present invention are to be described in detail referring to the drawings.

Figure 2:
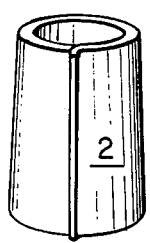
FIG. 2 is a perspective view of a cylindrical article prepared from the resin foam sheet bonded along its longitudinal direction.
Figure 3:
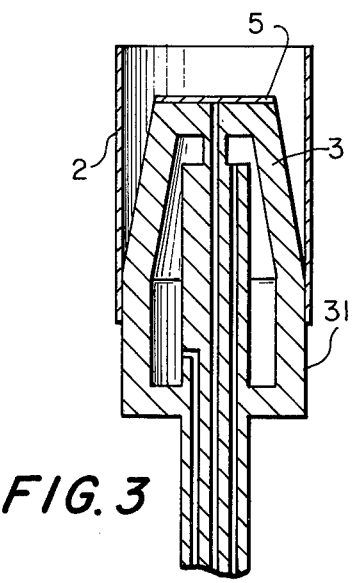
FIG. 3 is a sectional view illustrating the resultant cylindrical article fitted over a male mold.
Figure 4:
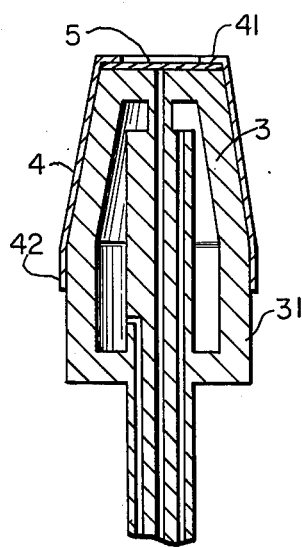
FIG. 4 is a sectional view of the cylindrical article subjected to heat shrinking in the state as shown in FIG. 3.
Figure 5:
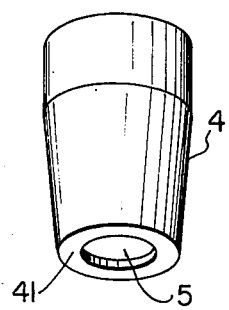
FIG. 5 is a perspective view of a resultant apertured receptacle viewing from its bottom produced by the steps illustrated in FIGS. 1-4.

An apertured receptacle having a flat and annular portion continuously provided at the lower end of the side wall and used for producing a receptacle using a die according to the present invention can be produced by a method disclosed, for example, in OLS 2,361,038. A uni-directionally shrinkable thermoplastic resin foam sheet 1 which, when heated, shrinks more significantly in one direction than in the direction perpendicular thereto and which has been cut into a rectangular sheet as shown in FIG. 1 is cylindrically bent in such a manner that it shrinks toward the axis of the cylinder when heated, overlapped along its longitudinal edges, fusion bonded by contacting a jig heated to a temperature between about 131°-200° C. to the overlapped portion to form a cylindrical body 2 as shown in FIG. 2. Then the cylindrical body 2 is fitted over a mold 3 having an outer forming surface corresponding to the shape of the inner surface of the receptacle to be produced and heated to a temperature between about 70°-100° C. in such a way that at least one end of the cylindrical body 2 extends beyond the flat end surface of the mold 3 as shown in FIG. 3, whereat the cylindrical body 2 is heated from its side by way of an infrared heater heating the atmosphere to about 180°-200° C. for 5-10 seconds and the cylindrical article is shrunk. Then, the end of the cylindrical body 2 that extends beyond the flat end surface of the mold 3 gathers centripetally to cover the periphery of the flat end surface of the mold 3 as shown in FIG. 4 thus forming an apertured receptable 4 having a flat annular portion 41 continuous with the lower end of the peripheral side wall as shown in FIG. 5.

A male mold as a part of a die of this invention can be used as the mold 3. When the male mold used for the die of this invention is utilized, the resultant apertured receptacle need not to be taken out therefrom for the subsequent process. Therefore, all the molds referred to in the succeeding descriptions mean the male mold 3.

The thermoplastic resin foam sheets used herein for producing apertured receptacle are such ones as comprising, as a basic material, for example, polystyrene, a copolymer of styrene with methylmethacrylate or acrylonitrile or the like, polymethylmethacrylate, polyethylene, polypropylene, polyvinyl chloride and the like and, as additives, one or more chemical foaming agents such as azodicarboxylic acid amides, dinitrosopentamethylene tetramine and the like or one or more highly volatile foaming agents such as propane, butane, pentane or the like, and capable of being subjected to expansion forming in an extrusion process.

The above foam sheets are uni-directionally shrinkable thermoplastic resin foam sheets which shrink highly in only one direction when heated to a temperature above the softening point thereof and do not substantially shrink or do not shrink at all in the direction perpendicular to the above shrinking direction. Numerically expressed, the shrinkage factor of the foam sheets in one direction is, for example, above 15% and more than 1.5 times the shrinkage along the direction perpendicular to the one direction when the sheet is subjected to heating at 134° C. for 5 seconds. Resin foam sheets which show more than 30% shrinkage in the direction along which higher shrinking is required and 0-10% shrinkage in the direction perpendicular thereto along which lower shrinking is required are preferably used in this invention. The lower shrinkage in the perpendicular direction can of course be negative, that is, the sheet may be expanded by about up to 5%, if desired. Foam sheets having the above described shrinking properties are formed into a cylindrical article while aligning the direction of higher shrinkage to agree with the periphery of the cylinder and aligning the direction of lower shrinkage to agree with the direction of the generator line of the cylinder, respectively, and, when the foam sheets are heated to a temperature above the softening point thereof, the inner diameter of the cylinder tends to reduce significantly while no substantial shrinkage along the generator line of the cylinder is encountered. Among the foam sheets above described, a uni-directionally heat shrinkable polystyrene foam sheet is rigid and is best suited for effective use in bending the same into a cylindrical article.

The thickness of the foregoing foam sheets varies depending upon the size of the receptacle to be formed and is preferably in the range between about 0.25–2 mm. With less than a 0.25 mm thickness, the foam sheet lacks proper rigidity, making it difficult to provide the proper strength when it is formed into a cylinder. In addition, if the shrinkage is high in heat shrinking, such a thin foam sheet can be torn. On the other hand, foam sheets of more than 2 mm thickness are unsuitable for forming into a cylinder, in particular, a cylinder of a smaller diameter because of the lack in bendability due to their high regidity. The foam sheets used in this invention preferably have a density less than about 0.4 g/cc and, more suitably, between about 0.4–0.06 g/cc.

A thermoplastic resin foam sheet 1 having the above described properties is cut into a rectangular shape, aligning its direction of higher shrinkage to its longitudinal direction, bent into a cylindrical form in such a way that it will shrink centripetally during heating toward the center axis of the cylinder and bonded at the longitudinal edges which are in contact in the cylindrical shape by fusion bonding or the like to form a cylindrical article 2 as shown in FIG. 2. While the cylindrical article 2 thus obtained retains therein circumferential stress and if it tears it will tend to tear in the circumferential direction when grasped strongly, tearability is highly improved in this invention as a bond is longitudinally provided on the cylindrical article.

The outer surface of an apertured receptacle 4 thus obtained loses smoothness due to spherically expanded cells and the thickness of the sheet increases from the opening to the lower portion of the receptacle 4 as shown in FIG. 4. Such a receptacle 4 is to be placed in a die of this invention.

The bottom plate 5 to be bonded using a die assembly of this invention to an annular bottom of the above apertured receptacle 4 to render the same water tight is flat, for example, disc shaped, and is of the same resin material as that of the thermoplastic resin foam sheet constituting the apertured receptacle 4. The resin materials composing the apertured receptacle 4 and the bottom plate 5 are preferably not different because they tend to detach from each other without a firm fusion bonding in such a case. It is also necessary that the foam sheet for the apertured receptacle 4 be heat shrinkable and the foam sheet for the bottom plate 5 be not substantially heat shrinkable. For the bottom plate, either a foamed or unfoamed resin sheet can be used as required.

According to the method of this invention, a receptacle made of a thermoplastic resin foam sheet is produced by fusion bonding, within a male and female mold assembly, a bottom plate 5 to the flat annular portion 41 of the apertured receptacle 4 formed as described above.

Figure 8:
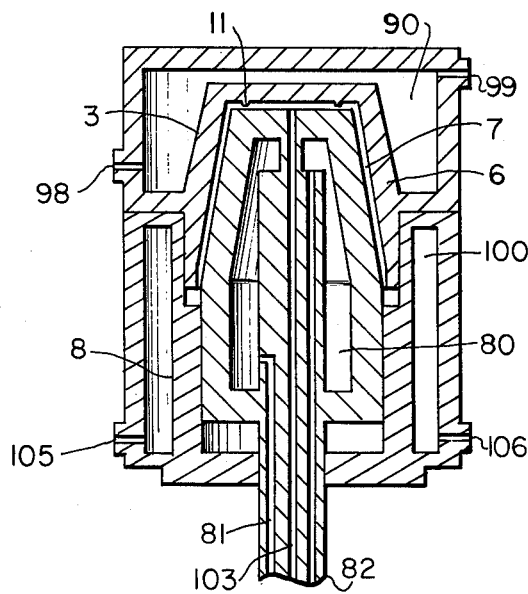
FIG. 8 is a sectional view of an embodiment of the invention similar to that shown in FIG. 7.
Figure 7:
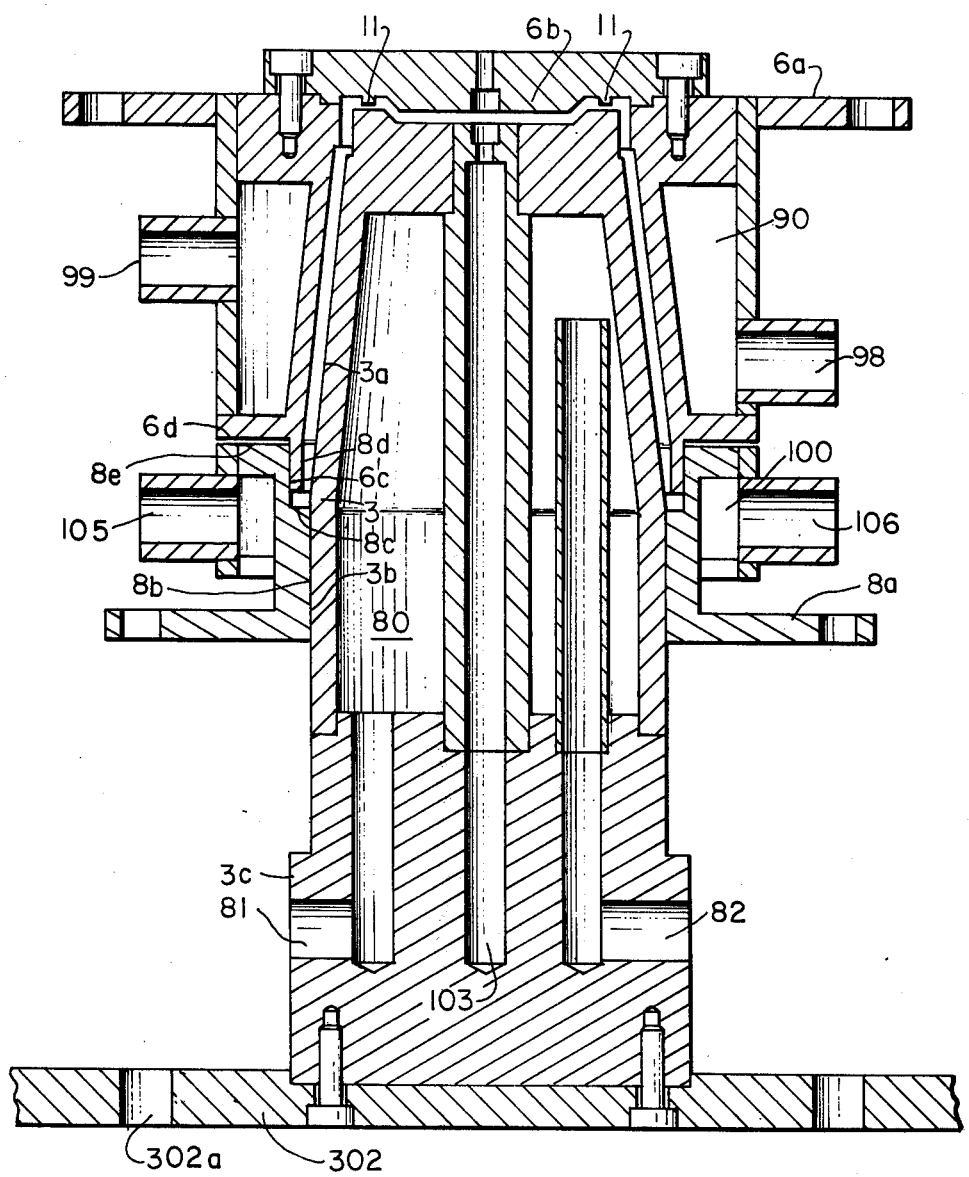
FIG. 7 shows a sectional view of male and female molds constituting the die according to the present invention.

Embodiments of such molds and rib forming members slidably mounted thereto for use in this invention are illustrated in FIGS. 7 and 8, wherein a die is shown with the rib forming member being pressed in FIG. 7.

Another embodiment of a rib forming member is shown in FIG. 8 in which a die is clamped and a rib forming member is pressed.

The die assembly used herein comprises, as shown in FIGS. 7 and 8, a male mold 3 and a female mold 6 which form a clearance 7 therebetween when clamped to each other, the clearance 7 corresponding to the shape of the desired receptacle. The inner forming surface 6A of the female mold 6 is shaped similar to the outer forming surface 3A of the male mold 3 over the entire circumference of the peripheral side wall, on which a uniform clearance 7 is provided.

The clearance 7 is made slightly narrower than the thickness of the thinnest portion of the side wall of the apertured receptacle 4. While the outer surface of the peripheral side wall of the receptacle gradually increases in thickness from the opening of the receptacle toward the bottom thereof, the outer surface is compressed as it moves in a sliding contact with the inner surface 6A of the female mold 6 when the die is pressed, because the clearance is adjusted to be narrower than the thickness of the peripheral side wall of the receptacle 4. As a result, cells present at the outer surface of the sheet material which constitutes the peripheral side wall of the receptacle 4 are stretched toward the opening and thereby assume a flat shape, thus providing a peripheral side wall having a smooth outer surface of excellent gloss and satisfactory printability as well as uniform thickness.

The reduction of the width of the clearance depends on the thickness of the receptacle 4 desired and it is sufficient to narrow the clearance in such a way that the thinner portion of the receptacle 4 near the opening thereof can be slightly compressed.

For example, a clearance of 0.7 mm width is used for an apertured receptacle whose side wall has a thickness of 0.7 mm at the opening and gradually increasing at a uniform rate to 1.0 mm at the lower end. The lower portion of the receptacle 4 having a greater thickness is thereby further compressed to provide the article with a smooth surface.

The side wall of the male mold 3 is tapered, preferably, at an angle of 3°–12°. Depending upon the shape of the resultant receptacle, the taper may be changed gradually, e.g. a greater taper angle can be provided at the upper portion of the mold and a smaller taper angle provided at the lower portion of the mold. Where a rib is formed at the lip of the opening of the receptacle, cylindrical portion 31 is preferably provided below the tapered portion 3A-1 of the peripheral side wall of the male mold 3. Thus, when an apertured receptacle 4 is formed using the male mold 3, the cylindrical article 2 snugly adheres by heat shrinking to a lower cylindrical portion of the male mold 3 at first and then gradually adheres snugly to tapered portions. Finally, the portion extending beyond the flat and surface 3B of the male mold 3 gathers centripetally toward the center axis of the cylinder to form a flat annular portion 41, thereby providing, as shown in FIG. 5, an apertured receptacle 4 with a cylindrical portion 42 at the upper end of the peripheral side wall, and a flat annular portion 41 continuously formed at the bottom. Reference numeral 103 denotes a vacuum conduit provided through the male mold 3 for attracting the bottom plate 5 in forming the apertured receptacle 4.

Figure 6:
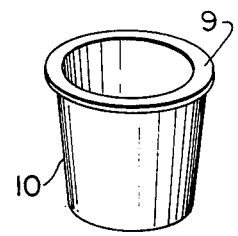
FIG. 6 is a perspective view of an example of a receptacle produced by using a die according to the present invention.

When a bottom plate 5 is placed over the flat end surface 3B of the male mold 3 and secured thereto by way of a vacuum drawn by means of vacuum conduit 103, cylindrical article 2 shrinks so as to envelope the bottom plate 5 therein as shown in FIG. 4. After engaging male mold 3 and female mold clamping, the cylindrical portion 42 of the apertured receptacle 4 is subjected to compression molding by pressing a rib-forming member 8 to reduce the volume as shown in FIG. 7 and a receptacle 10 having an integral rib 9 at the lip portion and the bottom plate 5 fusion bonded thereto is formed, as shown in FIG. 6. The above forming process are, desirably, effected at a temperature above the softening point of the foam resin sheet, that is, between about 70°–100° C., which is obtainable by keeping the male mold 3 at that temperature. In order to decrease the forming cycle time, it is desired to heat the male mold 3 to the above described temperature and to keep the female mold 6 at a temperature below 70° C., in particular, between about 10°–40° C. Where the female mold 6 and the male mold 3 are heated to the above specified temperature, a receptacle with smoother and more beautiful surface can be obtained, although the forming cycle time is increased as compared with a process in which the female mold is not heated but kept at a lower temperature. Too high a heating temperature is undesired because it melts and resinifies the foam resin sheet or collapses the cells to impair the appearance of the resultant receptacle, and additional time and effort is required to release the receptacle from the molds by way of cooling. Too low a temperature, on the other hand, causes wrinkles to develop on the surface of the receptacle or results in insufficient forming, and thus a satisfactory receptacle cannot be obtained.

The male mold 3 has a cavity 80 for heating and cooling, and the cavity 80 has a conduit 81 for charging heating medium and cooling medium and a conduit 82 for discharging these media. Similarly, the female mold 6 has a cavity 90 having conduits 98 and 99 which communicate the cavity 90 with charge and discharge pipes for heating medium and cooling medium respectively. Conduit 105 and 106 are provided also for the same purposes as in the charging conduits 81 and 98 and as in the discharging conduits 82 and 99, the conduits 105 and 106 communicating an inside cavity 100.

In the present invention, heating and cooling of the male mold 3, female mold 6 and the rib-forming member 8 are performed as described below. Heating and cooling required can be performed in a short time. Heating for the cavity 80 in the male mold 3 is effected by charging from the charging conduits 81, heating medium such as hot water, steam or the like into the inside cavities 80 and 90 and discharging through the discharging conduits 82 and 99 and the cooling is effected by supplying cooling medium such as cold water or the like. The rib-forming member 8 can also be heated and cooled by way of the inside cavity 100 by charging and discharging heating medium and cooling medium through the charging conduit 105 and discharging conduit 106 respectively. The male mold 3, the female mold 6 and the rib-forming member 8 composing the die assembly of this invention are made of a metal such as aluminum, heat resisting synthetic resin or the like.

Figure 26:
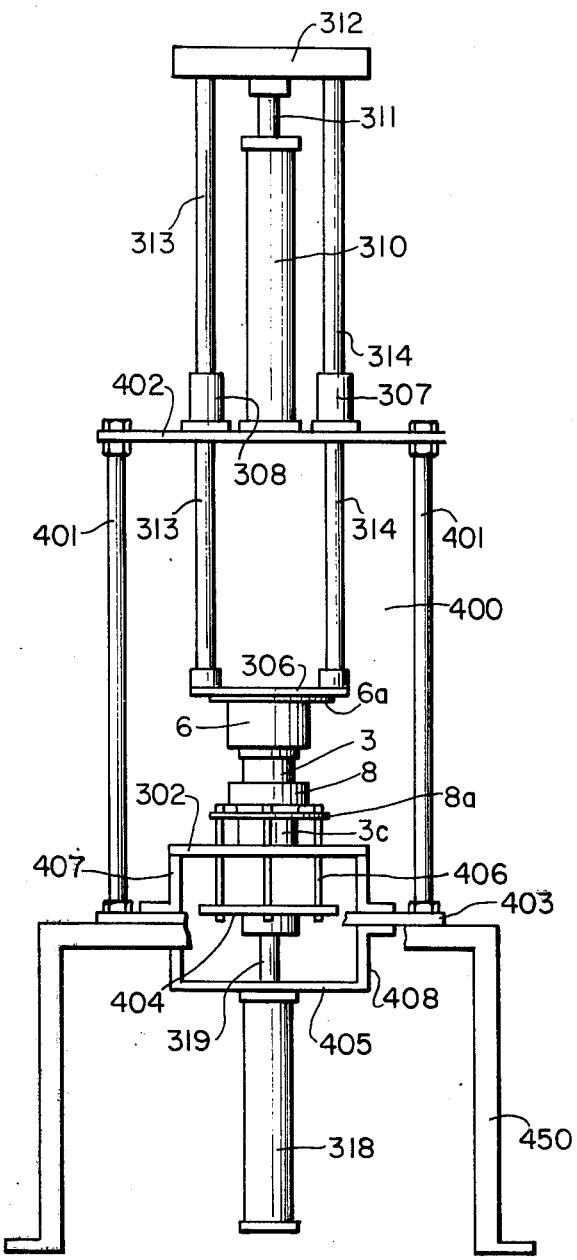
FIG. 26 is an elevation view illustrating the operation of the die of this invention.

The operation of the die according to this invention is to be described referring to the drawings. FIG. 26 is a schematic side elevation of the die assembly, wherein no descriptions are made to the piping system for the sources of pressurized air, heating medium, cooling medium and vacuum for the sake of brevity. In the embodiment shown, a male mold is stationary and a female mold and a rib-forming member are made movable. Male mold 3 is secured by way of plate 403 and L-shaped member 407 to plate 302. Female mold 6 is mounted by means of bolts and nuts at its flange 6a to movable plate 306. To the upper ends of four supports 401 (only two of them are shown) the lower end of which are secured to plate 403, is fixed plate 402, to which air cylinder 310 is connected. As piston rod 311 installed in the air cylinder 310 moves up and down, rods 313 and 314 move up and down by way of frame 312. Since rods 313 and 314 slidably pass through hollow guides 307 and 308 respectively and are secured at their ends to movable plate 306, moving plate 306 and female mold 6 mounted thereto move up and down with the up and down movement of piston rods 311. Provision of a stopper can be saved by adjusting pressure exerted on the female mold when the female mold slides downward with the downward movement of the piston rod 311 so as to make a balance between the pressure exerted on the bottom plate of the female mold and the pressure endurance of the bottom of an apertured receptacle.

In the state shown in FIG. 26, piston rod 311 goes down and male mold 3 meets female mold 6. Rib-forming member 8 is secured by its flange 8a to movable plate 404 by way of rods 406. Air cylinder 318 is fixed to plate 405, which is secured by way of L-shaped members 408 to plate 403. As air cylinder 318 operates, piston rod 319 is caused to move up and down which, in turn, moves rib-forming member 8 up and downward by way of moving plate 404 and rods 405. Rods 406 are slidably movable through apertures 302a formed in plate 302 as shown in FIG. 27(a). In the state shown in FIG. 26, rib-forming member 8 takes a lowered position. Chamber 400 of substantially parallel piped defined by plate 402, 403 and four supports 401 is covered at its four sides, except the sides for plate 402 and plate 403, with walls (not shown) in a heat insulating manner for improving the heat efficiency. An infrared heater can be provided to each of the walls for raising the prevailing temperature in chamber 400.

The die of this invention has clearance 7 formed between a pair of molds, i.e. a male mold and a female mold and having a width narrower than that of the side wall of apertured receptacle 4 and, in addition, at least one annular ridges 11 continuously provided in an integral manner either on the inner surface of female mold 6 or on the outer surface of male mold 3 and having a height 50–90% the thickness of the clearance 7. Where apertured receptacle 4 having annular portion 41 of 1.1 mm thickness and bottom plate 5 of 1.1 mm thickness to be joined to portion 41 are used and clearance 7 formed between male mold 3 and female mold 6 has a width of 7 mm, the effective thickness of clearance 7 is reduced to between about 3.5 mm–0.7 mm by integrally providing ridge 11 having a height between about 3.5–6.3 mm and a width between about 0.3–3.0 mm, preferably, 0.5–2.0 mm either on the inner surface of female mold 6 or on the outer surface of male mold 3.

The clearance 7 can be formed by pressing annular portion 41 and bottom plate 5 by the opeation of cylinder 310 shown in FIG. 26.

Figure 12A:
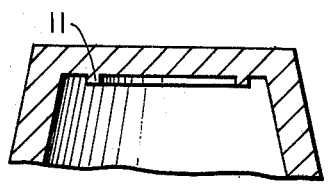
FIGS. 12a and b to 14a and b are sectional views which illustrate ridges or projections provided on the inner surface of the female mold.
Figure 12B:
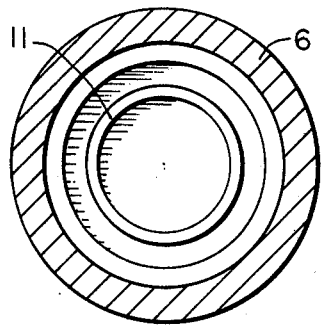
Figure 14A:
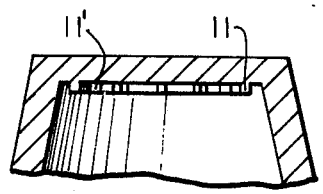
Figure 14B:
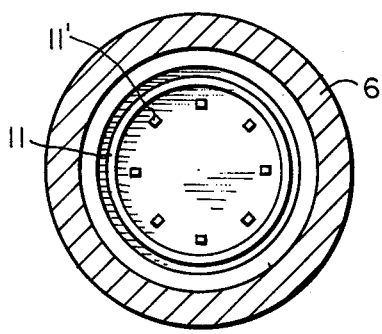

When the height of ridge 11 is less than 50% of clearance 7, bottom plate 5 cannot be firmly bonded to form a water tight seal and when the height is above 90%, those portions contacted with the ridge are completely resinified and become transparent, thus impairing the appearance of the receptacle. Ridges 11 can take various optional forms as desired such as a ring as shown in FIG. 12, a plurality of rings as shown in FIG. 14 and a combination of a ring 11 and a plurality of discrete projections 11' as shown in FIG. 14. When ridge 11 and projections 11' are used together, it is desired that both of them have the same height and the tops of ridge 11 and projections 11' be flat. Pointed tops are not desired because through holes or cuttings are liable to be produced in the resultant receptacle to impair the water tightness thereof.

Figure 9:
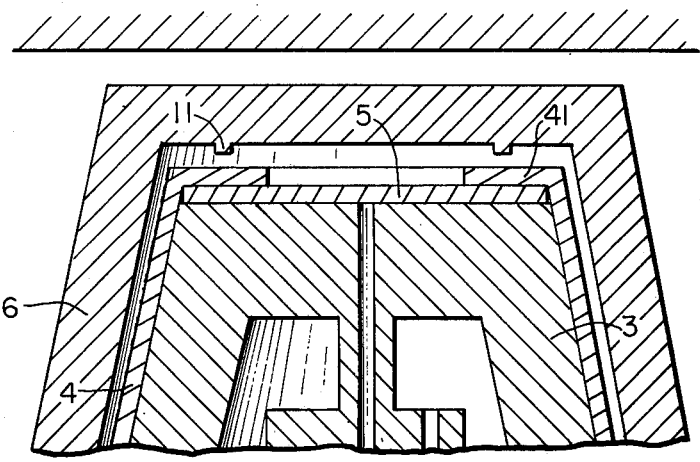
FIG. 9 is a sectional view of an enlarged portion of male and female molds immediately before their complete engagement.

Referring now to FIG. 9, there is shown female mold 6 and male mold 3 clamped together with ridge 11 being provided on the inner surface of the female mold 6, wherein annular portion 41 of apertured receptacle 4 and bottom plate 5 are going to be bonded through heat forming.

Figure 10:
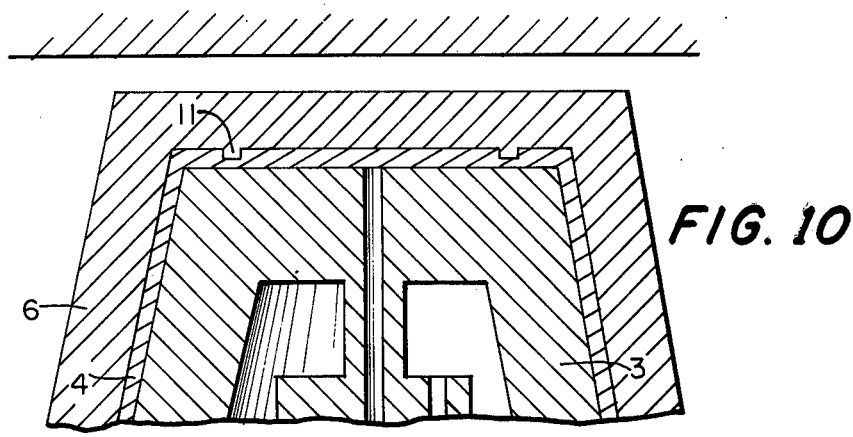
FIG. 10 is a sectional view of an enlarged portion of male and female molds in their engaged state.

Referring to FIG. 10, there is shown female mold 6 and male mold 3 clamped together wherein annular portion 41 of apertured receptacle 4 and bottom plate 5 are integrally bonded.

Figure 11:
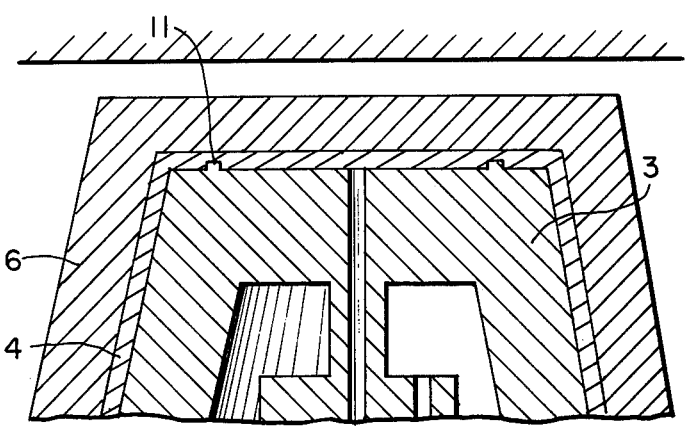
FIG. 11 is a sectional view of an embodiment of the invention similar to that in FIG. 10.

Ridge 11 is shown as provided on surface 3B of male mold 3 in FIG. 11.

Figure 13A:
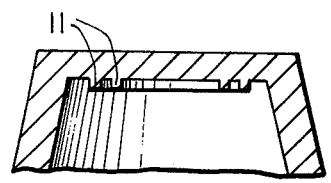
Figure 13B:
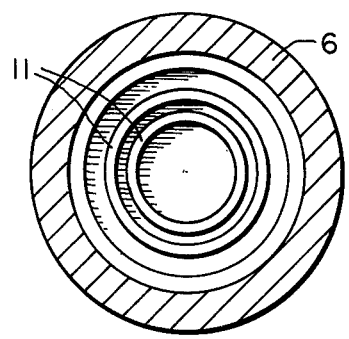

Ridge 11 is provided at a portion where it is contacted with annular portion 41 of the pre-formed apertured receptacle 4 and when a plurality of ring-shaped ridges, for example, as shown in FIG. 13 are provided, it is necessary that at least the outermost ring be located so as to be contacted with annular portion 41. The area of the top end of ridge 11 may vary depending on the size of annular portion 41 of apertured receptacle 4, the clamping pressure effected on the male mold 3 and female mold 6 and the like. If the area of the top end surface of ridge 11 is too large relative to that of the bottom of receptacle 4, the intended effect of firmly bonding annular portion 41 and the bottom plate 5 is lost, while on the other hand, if the area of the end surface is excessively small, through holes or cuttings are liable to be produced in the bottom of the resultant receptacle to impair the water tightness thereof.

Figure 16:
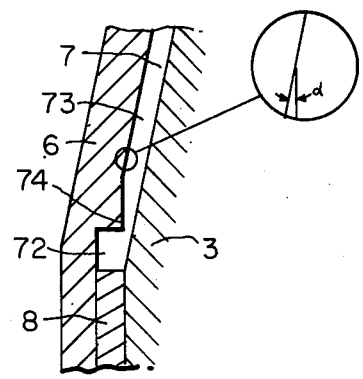
FIGS. 16 to 18 are sectional views of enlarged portions of the clearance between the mold members near the rib used in this invention.
Figure 17:
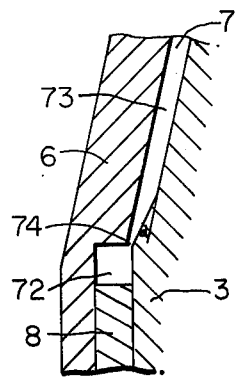
Figure 18:
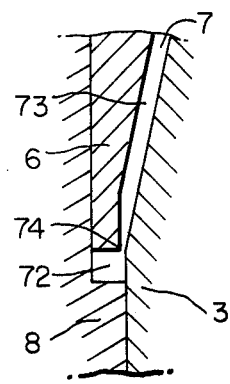

According to one embodiment of this invention, as shown in FIG. 16 to FIG. 18, an improved process of forming a rib at the lip of the opening of the receptacle is also provided, wherein clearance 7 corresponding to the desired shape of the receptacle to be obtained is established between female mold 6 and male mold 3 when they are clamped together. The clearance is adjusted along the entire circumference of portion 74 at the juncture of the peripheral side wall and the rib, where clearance 72 corresponds to the rib to be formed and clearance 73 corresponds to the peripheral side wall to take a restricted form which is reduced in width to 70–20% of clearance 73 corresponding to the peripheral side wall as shown in FIG. 16 to FIG. 18.

Figure 15:
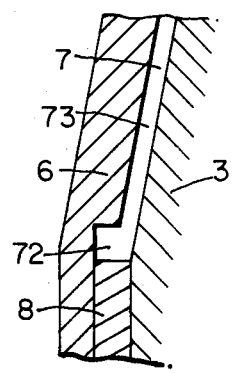
FIG. 15 is a sectional view of the clearance in a conventional mold.

In order to narrow the clearance, joining portion 74 of the clearance may be of various configurations, for example, as shown in FIG. 16 wherein the inner forming surface of female mole 6 steeply drops in a vertical direction from the lower portion of the peripheral side wall to the rib to form a restricted joining clearance 74 between the tapered surface of male mold 3 or, as shown in FIG. 17 and FIG. 18, wherein the taper of male mold 3 (FIG. 17) or female mold 6 (FIG. 18) is stepped suitably to form a restricted clearance 74. FIG. 16 and FIG. 18 show an enlarged view for the portion near the rib shown in FIG. 7 and FIG. 8, and FIG. 15 shows the clearance in a conventional die. If the width of clearance 74 at the juncture between the peripheral side wall and the rib exceeds 70% that of clearance 73 corresponding to the peripheral side wall, an undesired phenomenon occurs as in conventional molds, where the foam resin sheet softened by heating when compressed by rib-forming member 8 is resinified at the rib portion and escapes into clearance 73 (corresponding to the peripheral side wall) due to pressure applied from rib-forming member 8. As a result, wrinkles and distorsions develop in the peripheral side wall of the resultant receptacle. When a strong rib is desired, a large quantity of the sheet is naturally needed for the rib portion, which is highly uneconomical. On the other hand, if the width of the above clearance 74 decreases to below 20% of clearance 73 corresponding to the peripheral side wall, the resultant rib may some time detach from the side wall. Therefore, it is required that the clearance for the joining portion 74 above described has a width between about 70–20% that of clearance 73 corresponding to the peripheral side wall.

The joining clearance 74 should be provided in its restricted shape over the entire circumference of the rib portion, because even a partial lack of such a restriction allows the partially resinified sheet softened by heating to pass therethrough and flow into clearance 73 corresponding to the peripheral side wall due to pressure from the rib-forming member.

In order to form the above joining clearance 74 into a restricted shape, the forming surface of male mold 3 or female mold 6 is tapered relative to the extension line of the forming surface corresponding to the peripheral side wall, as shown in FIG. 16 to FIG. 18, at a uniform angle which is substantially the same or less than the tapered angle of the forming surface of the peripheral side wall of the mold as depicted as "α" in enlarged view in FIG. 16, wherein the tapered angle is provided so as to approach the vertical axis of the die assembly in the case of the female mold as shown in FIG. 16 and FIG. 18 and it is provided so as to leave the vertical axis in the case of the male mold as shown in FIG. 17.

Surfaces of the female mold and the rib-forming member respectively corresponding to the upper and the lower surfaces of the rib to be formed are made substantially horizontal. The length for the restricted portion of the joining clearance 74 is, desirably, less than ½ and more preferably less than 1/5 that of the portion corresponding to the peripheral side wall. Rib-forming member 8 is provided so as to move separately from male mold 3 and/or female mold 6 in clearance 72 corresponding to the rib.

Referring to the formation of a rib for a receptacle by using the die assembly according to this invention, the rib corresponding to clearance 72 can be formed by engaging male mold 3 and female mold 6 to each other and pressing the portion of the foam sheet present in the generally parallel cylindrical clearance 72 formed in the lower portion between female mold 6 and male mold 3 by the operation of a cylinder or the like to thereby compress the foam sheet softened by heating and reducing the volume thereof through partial resinification. Rib-forming member 8 described above can slidably be mounted between male mold 3 and female mold 6 as shown in FIG. 7 or, alternatively, cam comprise a part of female mold 6 as shown in FIG. 8. The heating temperature for forming the rib is desirably between about 70°–100° C. The length of the foam sheet form which the rib is to be formed varies depending upon the thickness and expansion degree of the sheet, the diameter of the receptacle opening and the like, but it is, preferably, between about 5–15 times the length of the resultant rib as it is preferred to compress the sheet to 20–70% of its original length. For example, when a foamed sheet 0.5 mm thick and with an expansion degree of a factor of 5 is used, the resultant receptacle is excellent both in appearance and in strength by taking a 30 mm long portion to form the rib and compressing the portion to a 3 mm height to form the rib.

It is, therefore, necessary that rib-forming member 8 moves slidably over a distance more than 30 mm in this case.

Figure 19:
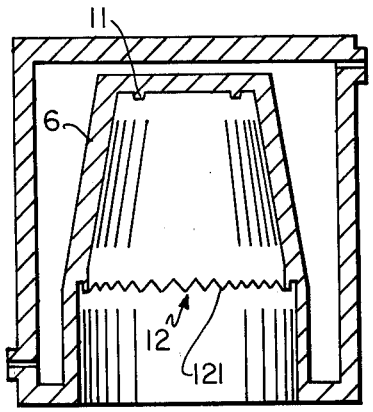
FIG. 19 is a sectional view of a female mold mounted with a rib-clamping member for use in this invention.

The die assembly of this invention can further comprise a plurality of stepped portions 121 continuously over the entire circumference thereof as shown in FIG. 19, wherein annular rib-clamping member 12 includes steps, the height between the base of each step and the top of a step adjacent thereto being between about 25–75% the thickness of the finished rib of the resultant receptacle and the top of each step being pointed. Rib-clamping member 12 is provided so that it abuts against the lower surface of the resultant receptacle, and the rib is thereby formed at the lip of the opening of the receptacle by clamping Rib-clamping member 8.

Figure 22:
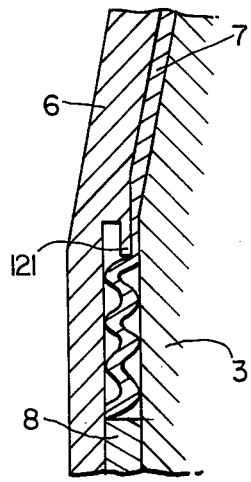
FIG. 22 is a cross sectional view which illustrates a rib-forming member in the state pressing the rib.

Conventionally, a rib is usually formed by forcing rib-forming member 8 upward after clamping male mold 3 and female mold 6, preferably, within a period between about 0.05 to 5 seconds, along the lower cylindrical part of male mold 3 to press the foam sheet. However, such a conventional method has a defect. Since the width of the clearance through which rib-forming member 8 is inserted is greater than the thickness of the foam sheet, the sheet is compressed in a bellows-like shape by the pressing of rib-forming member 8 as shown in FIG. 22, the resultant rib is loosened again from the bellows-like shape after the resultant receptacle is cooled and taken out of the die if the foam sheet is not sufficiently softened through heating in the conventional method. If the foam sheet is excessively heated, it is melted throughly and resinified to result in a significant decrease in volume, thus requiring a large amount of foamed sheet for the formation of the rib, which is extremely uneconomical.

Figure 20:
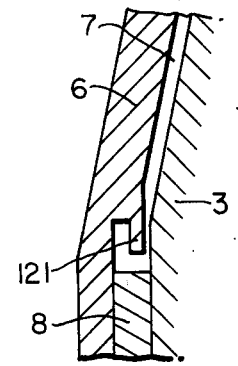
FIGS. 20 and 21 are sectional views of the enlarged portions of the clearance between the mold members near the rib member of this invention.
Figure 21:
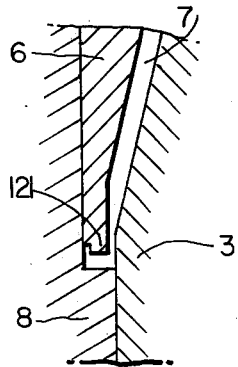
Figure 23:
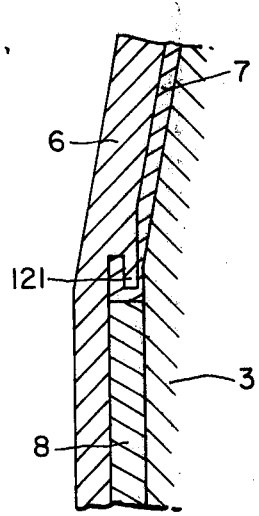
FIG. 23 is a sectional view which illustrates a rib-forming member as compressed to the state shown in FIG. 22.

According to this invention, the above defect in the prior art is overcome by forming clearance 74 in the heretofore described restricted shape and, in addition, by the use of a rib-clamping member 12 having the structure as described above. The rib-clamping member may comprise a part of female mold 6 or be a separate member mounted on female mold 6. The plurality of steps 121 continuously formed over the entire circumference of rib-clamping member 12, most preferably, take the shape of saw teeth and the top of each step is pointed as shown in FIG. 19. If the tops of the stepped portions 121 are not pointed, the foam sheet bent into a bellows-like shape cannot sufficiently be pressed. Enlarged views for the portions near the rib-clamping member 12 are shown in cross section in FIG. 20 and FIG. 21. A sheet compressed in a bellows-like shape by means of rib-forming member 8 is shown in FIG. 22 and the rib just after the formation is shown in FIG. 23. The height between the base of each step and the top of a step adjacent thereto in the above stepped portions 121 is, preferably, 25–75% the final height of the resultant rib. While the above specified height of the stepped portions 121 somewhat varies depending upon the height of a rib, a step height more than 75% of the rib height results in holes in the resultant rib and reduces rib strength. On the other hand, with a step height less than 25% of the rib height, the object of firmly clamping the foam sheet for the rib bent in a bellows-like shape cannot sufficiently be attained.

Figure 27C:
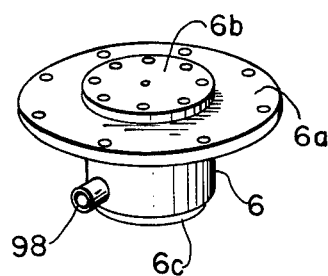
FIGS. 27 (a), (b), (c) and (d) are perspective views for each of the members constituting the die.
Figure 27B:
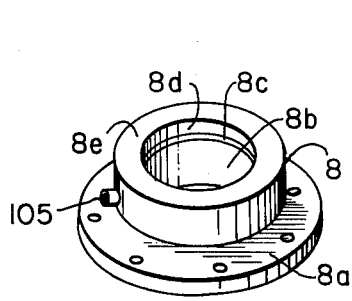
Figure 27D:
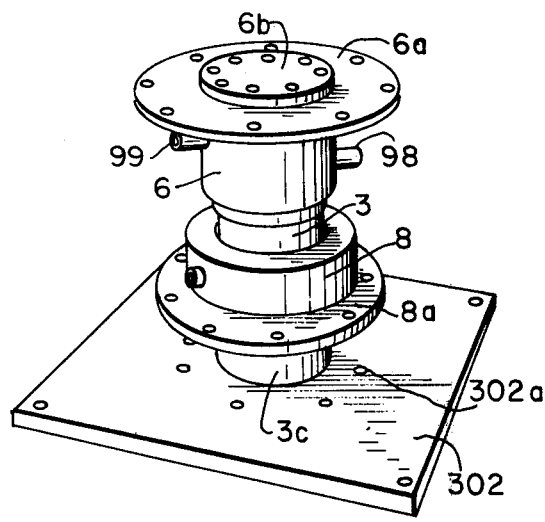
Figure 27A:
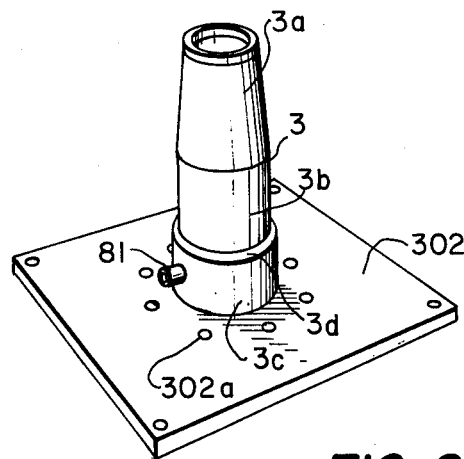

FIG. 27 shows an example of members composing the die assembly of this invention each in perspective, wherein FIG. 27(a) shows a male mold, FIG. 27(b) shows a rib-forming member, FIG. 27(c) shows a female mold and FIG. 27(d) shows the male mold, female mold and rib-forming member combined in an assembly.

Referring to FIG. 27(a), male mold 3 comprises a frustoconical portion 3a having an outer surface of a shape corresponding to that of the inner surface of a receptacle to be formed, cylindrical portion 3b in continuous with frustoconical portion 3a, and another cylindrical portion 3c with a greater diameter than that of cylindrical portion 3b, the juncture between cylindrical portion 3b and 3c forming step 3d which serves as a stopper when the rib-forming member is lowered.

Referring to FIG. 27(b), flange 8a is provided for connecting the rib-forming member to its driving means. Surface 8b is in sliding contact with cylindrical portion 3b of male mold 3. Step 8c is provided for pressing the upper end of an apertured receptacle closely fitted over cylindrical portion 3b of male mold 3. Surface 8d is in sliding contact with the outer surface of cylindrical portion 6c of female mold 6. Surface 8e abuts against surface 6d (FIG. 7) of female mold 6 when the rib-forming member is raised to form a rib, thereby controlling the thickness of the rib.

Referring to FIG. 27(c), split mold 6b having a surface for defining the outer surface of the bottom of the resultant receptacle is detachably mounted to the main body of female mold 6. Height, width and numbers of ridge 11 can therefore be changed easily by replacing the split mold 6b. 6a represents a flange for connecting to driving means.

As heretofore stated, according to this invention, receptacles produced have a peripheral side wall of uniform thickness and unevenness on the surface thereof can be avoided by the pressurization of the male mold and/or female mold. This invention is therefore suitable for the reproducible mass production of receptacles of identical dimensions having a beautiful and glossy surface.

The smoothness of the surface is extremely advantageous for printing. Without pressing treatment for the surface as described above, cells present in the surface take in a spherical shape and result in irregularities on the surface, so that fine letters and patterns, in particular, cannot be printed or printed matter lack clarity. The receptacles produced according to this invention have a smooth surface and therefore can be printed with printing as clear as on paper. Where the printing is applied to the resin foam sheet prior to forming, the printed surface is also made smooth by the pressurization of the forming female mold and the printed matter retains its clarity. Moreover, since the die assembly of this invention has a ridge or combination of a ridge and projections provided either on the inner surface of the female mold or on the outer surface of the male mold at positions at which the annular portion of the apertured receptacle is abutted against and the bottom plate is fusion bonded to the annular portion of the apertured receptacle, the bottom plate is firmly bonded with ease to the annular portion of the receptacle.

In addition, since the fusion bonding is effected within a pair of male mold and female mold, no burrs due to flashes of resin result in the bottom of the receptacle, and water tight receptacles having a beautiful appearance and resulting in no problems during stacking can be obtained.

The provision of a ridge or a combination of a ridge and projections can provide the advantages as described below. In conventional processes, the clearance formed between a female mold and a male mold must necessarily be adjusted mechanically in view of the clamping pressure by the provision of a stopper, which makes the structure of the die complicated as well as increases the apparatus costs. On the contrary, the method of this invention is advantageous in that by the provision of a ridge or a combination of a ridge and projections, the clamping pressure can be reduced because pressure is applied only to the ridge or projections and the thickness of the bottom and the peripheral side wall of the resultant receptacle can be adjusted to a uniform thickness (without the provision of a mechanical stopper) because the ridge or the combination of the ridge and projections provided on the female mold and the male mold serves to adjust the thickness.

Further, a decorative effect can also be obtained in that the ridge or the projections produce a pattern of the ridge or projections as copies on the bottom of the receptacle at the positions where they are abutted, thus increasing the commercial value of the receptacle.

Further, since the clearance joining the portions corresponding to the rib and to the peripheral side wall is formed as a restricted shape for forming a rib at the opening of the receptacle in this invention, the foam sheet softened through heating, when pressed by the rib-forming member in the clearance corresponding to the rib, cannot substantially escape being forced by said rib-forming member into the clearance corresponding to the peripheral side wall. Therefore, no wrinkles or distortions result in the peripheral side wall of the receptacle because of the reduced movement of the resin in the rib, and the resin foam sheet for the formation of the rib can be saved in amount, lowering foam sheet requirements and thereby providing a great economical advantage.

The reduced movement of the resin in the rib portion also enables the forcing of the rib-forming member with greater pressure to reduce the time required for pressing, thereby increasing forming efficiency.

In addition, since the joining clearance is formed into the foregoing restricted shape and as annular rib-clamping member having a plurality of steps over the entire circumference thereof can be used in this invention, excellent advantages are attained in that the rib formed from the foam sheet can be firmly clamped without being loosened again from a bellows-like shape, and the clamping effect is increased since the flow of the resin is restricted because of the restricted shape of the joining clearance, thus resulting in an extremely strong rib.

This invention will now be further described by specifically referring to several working examples together with a comparison example.

EXAMPLE 1

Figure 24:
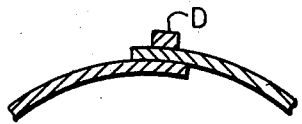
Figure 25:
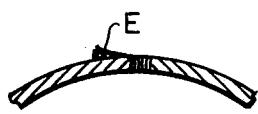

A uni-directionally shrinkable polystyrene resin foam sheet 0.5 mm thick and of a 0.18 g/cc density having a shrinkage factor of 50% in one direction and a shrinkage factor of 4% in the direction perpendicular to the above direction was cut into a rectangular sheet 295 mm 33 150 mm, aligning its longitudinal direction to one direction along which higher shrinkage results. Then, the cut sheet was bent into a cylindrical shape in such a way as to shrink when heated centripetally toward its center axis and fusion bonded at the overlapped portion of longitudinal edges into a cylindrical article by means of a jig heated at 170° C. In bonding both edges of the foam sheet 1 to form a cylindrical article 2, when they were bonded by means of a heated jig while leaving the extreme end of the overlapped portion unbonded as shown in FIG. 24, the end would usually warp above the outer surface to form burrs E as shown in FIG. 25. However, according to the method of this invention, a receptacle of a smooth surface can be obtained by the pressing of female mold 6 even when such burrs are formed.

The resultant cylindrical article was fitted over a male mold previously heated to 80° C. in such a way as to extend beyond the flat end surface of the male mold by 15 mm. At the same time, a bottom plate made of a non-heat shrinkable flat disk-shaped polystyrene resin foam sheet 68 mm in diameter and having a thickness of 1.1 mm and a density of 0.091 g/cc was placed on the flat end surface of the male mold and, after being secured thereto by means of vacuum drawing through a vacuum aperture provided in the male mold, heated for 7 seconds from its side by means of infrared ray heater which kept the atmosphere at 180° C. The cylindrical article shrank by way of heating and snugly fitted the outer forming surface of the male mold, while the portion extending beyond the flat end surface of the male mold gathered centripetally toward the center axis of the cylinder to form a flat annular portion so as to cover the bottom plate. An apertured receptacle having a flat annular portion continuous with the bottom of the peripheral side wall with the bottom plate being bonded to the inner side of the annular portion was thus be formed with a wall thickness of 0.7 mm at the upper opening, 1.0 mm at the bottom and a thickness of 1.1 mm for the annular portion thereof.

Then, while the bottom plate and the apertured receptacle were mounted on the male mold as above, a female mold having an inner forming surface similar to the outer forming surface of the male mold was engaged to the male mold. Clearance, that is, the gap between the outer forming surface of the male mold and the inner forming surface of the female mold, was evenly adjusted to 0.7 mm for the peripheral side wall and to 0.8 mm at the bottom other than at those portions corresponding to ridges. The male and female molds were clamped to each other by applying a pressure of 170 Kg to the female mold while heating the male mold to 90° C. and cooling the female mold to 30° C., and the bottom plate pressed and fusion bonded to the annular portion of the apertured receptacle. The female mold used herein had integrally provided on its inner forming surface an annular ridge of a height of 0.5 mm (62.5% of the clearance), a width of 1.0 mm and an inner diameter of 40 mm, at the position where the annular portion of the apertured receptacle is contacted.

The female mold was then left as it was without releasing for 0.2 sec after the clamping, during which time the foam sheet closely fitted to the lower cylindrical portion of the male mold was compressed vertically by 30 mm by means of a rib-forming member heated to a temperature of 90° C. with a pressure of 160 Kg to form a rib. Thereafter, the male mold and the rib-pressing member were cooled to 65° C. in 7 sec, and the formed cup taken out by releasing the molds.

Heating and cooling of the apparatus is performed as follows. Charge and discharge ports were provided through the inside cavity within the male mold as well as the female mold. Heated steam was supplied from the charge port and condensed water discharged through the discharge port for heating the male mold while on the other hand, cold water was charged and discharged for cooling. Heating and cooling were thus be performed for a short time. The female mold was usually be supplied with water at a temperature of 30° C.. The rib-pressing member was also provided with charge and discharge ports and could be rapidly heated and cooled by heating the male mold from its side and feeding water to the female mold.

The cup produced as above according to the method of this invention had an upper opening 89 mm in diameter, a bottom 67 mm in diameter, a 105 mm height, a thickness of 0.7 mm at its peripheral side wall, 0.8 mm at the bottom and 0.4 mm at the portion contracted by the ridge provided on the female mold, a rib with a radial width of 3 mm and a height of 2 mm, and an inside capacity of 465 ml. In the resultant cup, the bottom plate was firmly fusion bonded, no burrs were found at the side or the bottom, the outer surface of the peripheral side wall showed a satisfactory gloss, the wall thickness was uniform and complete water tightness was attained, without leakage when the cup was filled with water.

COMPARISON EXAMPLE 1

A cup was made in the same manner as in Example 1 with the exception of using a female mold having no ridges at the inner forming surface contacted by the annular portion of an apertured receptacle. The fusion bonding between the bottom plate and the annular portion of the resultant cup article was poor and the bottom plate easily peeled off the bottom of the cup. Water leaked through the incompletely bonded portion of the cup when it was filled with water. Wrinkles were observed at the lower inner surface of the rib formed at the upper opening of the cup and at the upper portion of the peripheral side wall which impaired the appearance near the rib. The foam sheet for the rib fusion bonded under pressure onto the side wall in a bellows shape was also loosened because of the incomplete fusion bonding.

EXAMPLE 2

A cup was produced in the same manner as in Example 1 with the exception of using a die assembly whose clearances, as gaps between the outer forming surface of the male mold and the inner forming surface of the female mold were adjusted to 0.7 mm at the peripheral side wall, 0.8 mm at the bottom, a 3 mm radial width and a 2 mm height at the rib portion, and 0.3 mm at the portion where the side wall and the rib joined (about 43% of the clearance at the side wall). The resultant cup had the same dimensions as that obtained in Example 1 except that the length of the portion where the side wall joined the rib was reduced to 0.5 mm. In this cup, the bottom plate was firmly bonded, no burrs are observed in the bottom and complete water tightness was maintained with no leaks when the cup was filled with water. Moreover, no wrinkles resulted on the lower inner surface of the rib formed at the upper opening of the cup or in the upper portion of the peripheral side wall, presenting an extremely fine appearance as compared with the rib in Example 1.

EXAMPLE 3

A cup was formed in the same manner as in Example 2 with the exception of using a rib presser member having continuous steps over the entire circumference thereof with a height of 1 mm between the base of each step and the top of the adjacent step, a distance of 2mm between the center lines of adjacent steps and with an apex angle of 90° for the pointed top of the step. The resultant cup had the same dimensions as the receptacle obtained in Example 2.

In the formed cup, the bottom plate was firmly bonded, no burrs were observed at all and complete water tightness was maintained without leakage when the cup was filled with water. In addition, no wrinkles were observed in the lower inner surface of the rib formed at the upper opening of the cup or in the upper portion of the peripheral side wall, both presenting a very fine appearance. Moreover, the foam sheet at the rib was sufficiently fusion bonded under pressure in a bellows shape to form a stronger rib than was obtained in Examples 1 and 2, which did not loosen in use.

EXAMPLE 4

A uni-directionally shrinkable polystyrene resin foam sheet 0.4 mm thick and of a 0.15 g/cc density having a shrinkage factor of 42% in one direction and a shrinkage factor of 4% in the direction perpendicular to said one direction was cut into a rectangular sheet 225 mm × 120 mm, aligning its longitudinal direction to the direction along which higher shrinkage resulted. The cut sheet was then bent into a cylindrical shape in such a manner as it would shrink centriperally, when heated, toward its center axis and fusion bonded by overlapped both edges into a cylindrical article by means of a jig heated at 170° C.

The resultant cylindrical article was fitted over a male mold, which had been previously heated to 80° C., in such a way as to extend beyond the flat end surface of the male mold by 10 mm as in Example 1. At the same time, a bottom plate made of a non-heat shrinkable disk-shaped polystyrene resin foam sheet of 50 mm in diameter and having a 1.1 mm thickness and a 0.091 g/cc density was placed on the flat end surface of the male mold and, after being secured thereto by means of vacuum drawn through the vacuum port provided in the male mold, heated for 7 seconds from its side by means of an infrared ray heater keeping the atmosphere at 180° C. The above cylindrical article shrank through heating, closely fitting to the outer forming surface of the male mold, while the portion extending beyond the flat end surface of the male mold was gathered centripetally toward the center axis of the cylinder to form a flat annular portion so as to cover edges of the bottom plate. An apertured receptacle having a flat annular portion continuous with the bottom of the peripheral side wall with the bottom plate being mounted at the inner side of the annular portion was thus formed, with a side wall thickness of 0.9 mm at the lower portion and a thickness of 1.1 mm for the annular portion.

Then, while the bottom plate and the apertured receptacle were mounted to the male mold as above, a female mold having an inner forming surface similar to the outer forming surface of the male mold was engaged by the male mold. The clearance, which was the gap between the outer forming surface of the male mold and the inner forming surface of the female mold, was evenly adjusted to 0.5 mm for the peripheral side wall and the clearance at the bottom was evenly adjusted to 0.8 mm. The male mold and the female mold were clamped with a pressure of 110 Kg while heating both molds to 90° C., thereby fusion bonding the bottom plate to the annular portion of the apertured receptacle. The female mold used in this example had integrally provided on its inner forming surface a ring-shaped ridge of 0.5 mm in height, 1.0 mm in width and 40 mm in inner diameter, at the position where the annular portion of the apertured receptacle was contacted.

Then, the female mold was left as it was without releasing for 0.2 sec. after the clamping, during which time the foam sheet closely fitted to the parallel portion provided at the lower part of the male mold was compressed vertically 30 mm by means of a rib-forming member with a pressure of 100 Kg and at a temperature of 90° C. to form a rib. After that, the male mold and the female mold were cooled to 65° C. for 10 sec. and the mold released and the formed cup taken out.

Heating and cooling for this apparatus were effected as in Example 1.

The cup produced as above by the method of this invention had an apper opening 73 mm in diameter, a bottom 49 mm in diameter, a height of 81 mm and thickness of 0.5 mm at the side wall, 0.8 mm at the bottom and 0.5 mm at the portion contacted by the ridge provided on the female mold, a rib of 3 mm radial width and 2 mm in height and an inside capacity of 205 ml. In the resultant cup, the bottom plate was firmly fusion bonded, no burrs, were observed at the bottom and complete water tightness was maintained with no leaks when cup was filled with water as in Example 1.

EXAMPLE 5

A cup article was produced in the same manner as in Example 4 with the exception of using a die assembly the clearance of which was adjusted to 0.3 mm in the portion where the portions for the side wall and the rib joined. The resultant cup had the same dimensions as that obtained in Example 4 except that the joining portion of the side wall and for the rib was reduced to 0.4 mm. The cup was firmly bonded with the bottom plate, showed no burrs at the bottom edge and did not leak water, when filled with water, maintaining complete water tightness. Moreover, no wrinkles are observed at all in the lower inner surface of the rib formed at the upper opening of the cup or in the upper side wall, thus providing a fine appearance as compared with the rib obtained in Example 4.

While a preferred embodiment of the invention has been described, it is to be understood that changes and variations may be made without departing from the spirit or scope of the following claims.

What is claimed is:

1. A method for producing a receptacle from a thermoplastic resin foam sheet, which comprises forming a cylindrical article by bonding the opposite sides of a rectangular-shaped unidirectionally shrinkable thermoplastic resin foam sheet which, when heated, shrinks in a first direction to a greater extent than in a direction perpendicular to said first direction, so that when heated, a resulting cylindrical article will shrink toward the central axis thereof, fitting said cylindrical article over a male mold having a cylindrical lower portion, with an end portion of said cylindrical article extending beyond the flat end surface of the male mold, heating said cylindrical article to a temperature above the softening point of the resin of said sheet, whereby said cylindrical article shrinks toward the central axis thereof and intimately contacts said male mold to form an apertured article having a flat annular portion continuous with the initial peripheral side wall, placing a flat bottom plate onto said flat annular portion, compression-molding under heat said apertured article together with said flat bottom plate by means of a male mold and a female mold, a pair of which molds, when clamped, defining a clearance that is less than the thickness of the initial peripheral side wall of said apertured article, and said molds having at least one annular ridge, for contacting said annular portion, continuously provided either on the inner surface of the female mold or on the outer surface of the male mold, said ridge having a height of 50–90% of the clearance spacing between said molds to thereby bond said apertured article and said flat bottom plate together and make the wall thickness thereof uniform, pressing the lip portion of a resulting receptacle vertically by means of a rib-forming member to reduce the volume thereof to form a rib, and removing the resulting receptacle after cooling the molds.

2. The method of claim 1, wherein the male mold is heated to 70° to 100° C. during the heating and compression moulding step.

3. The method of claim 1, wherein the female mold is always cooled.

4. The method of claim 1, wherein the clearance to be defined, corresponding to the side wall of the resulting article, by the surfaces of the molds is smaller than the wall thickness of the apertured article by 0.2 to 0.5 mm.

5. The method of claim 1, wherein said unidirectionally shrinkable thermoplastic resin foam sheet has a thickness of about 0.25 to 2 mm and a density of about 0.4 to 0.06 g/cc.

6. The method of claim 1, wherein the resin material of said bottom plate is the same as the resin material of said unidirectionally shrinkable thermoplastic resin foam sheet.

7. The method of claim 1, wherein the resin material of said bottom plate is a thermoplastic resin foam sheet.

8. The method of claim 1, wherein said thermoplastic resin of said unidirectionally shrinkable thermoplastic resin foam sheet is a polystyrene resin.

9. The method of claim 1, wherein the shrinkage of said unidirectionally shrinkable thermoplastic resin foam sheet is such that when said sheet is heated at 135° C. for about 5 seconds, said shrinkage in said first direction is at least 1.5 times the shrinkage in said other directions perpendicular to said first direction and said shrinkage factor in said first direction is at least about 15%.

10. The method of claim 1, wherein said bottom plate is inserted into said mold member prior to fitting of said resulting cylindrical article over said mold member.

11. The method of claim 1, wherein said bottom plate is placed inside the peripheral bottom edge of said resulting cylindrical article.

12. The method of claim 1 further comprising compressing said lip portion towards a joining portion having an area of reduced clerance between said male and female molds for preventing flowback of resinified foam and resultant distorsions from developing in the peripheral side wall of the receptacle.

13. The method of claim 12, wherein the reduced clearance is provided to said female mold at the conjucture of the joining portions of said female mold corresponding to said rib and to said peripheral side wall.

14. The method of claim 12, wherein the clearance for said joining portion is restricted over the entire circumference to 20-70% of the width of the clearance corresponding to said peripheral side wall.

15. The method of claim 12, wherein, in the joining portion, surface of the female mold and surface of the rib-forming member that correspond respectively to the upper and the lower surfaces of the rib are made substantially horizontal, and the forming surface of the female mold is tapered substantially at a uniform angle from the extension line of the forming surface of the female mold for peripheral side wall toward the center axis of the die.

16. The method of claim 15, wherein the tapered angle is less than that of the forming surface corresponding to the peripheral side wall.

17. The method of claim 15, wherein the tapered angle is substantially the same as that of the forming surface corresponding to the peripheral side wall.

18. The method of claim 12, wherein a joining portion which narrows the clearance defined between said male mold and said female mold corresponding to said peripheral side wall to be formed is provided to said male mold at the juncture of the portions of said male mold corresponding to said rib and to said peripheral side wall.

19. The method of claim 18, wherein the clearance for the joining portion is restricted over the entire circumference to 20-70% of the width of the clearance corresponding to the peripheral side wall.

20. The method of claim 18, wherein, in the joining portion, the surface of said female mold and the surface of said rib-forming member correspond respectively to the upper and lower surfaces of the rib and are made substantially horizontal and the forming surface of said male mold is tapered substantially at a uniform angle from the extension line of the forming surface of said male mold corresponding to said peripheral side wall toward a direction leaving the vertical center axis of the die.

21. The method of claim 20, wherein the tapered angle is less than that of the forming surface corresponding to the peripheral side wall.

22. The method of claim 20, wherein the tapered angle is substantially the same as that of the forming surface corresponding to the peripheral side wall.

23. The method of claim 13, wherein the length of the joining portion is less than one-third that of the portion corresponding to the peripheral side wall.

24. The method of claim 18, wherein the length of the joining portion is less than one-third that of the portion corresponding to the peripheral side wall.

* * * * *